Patented July 5, 1932

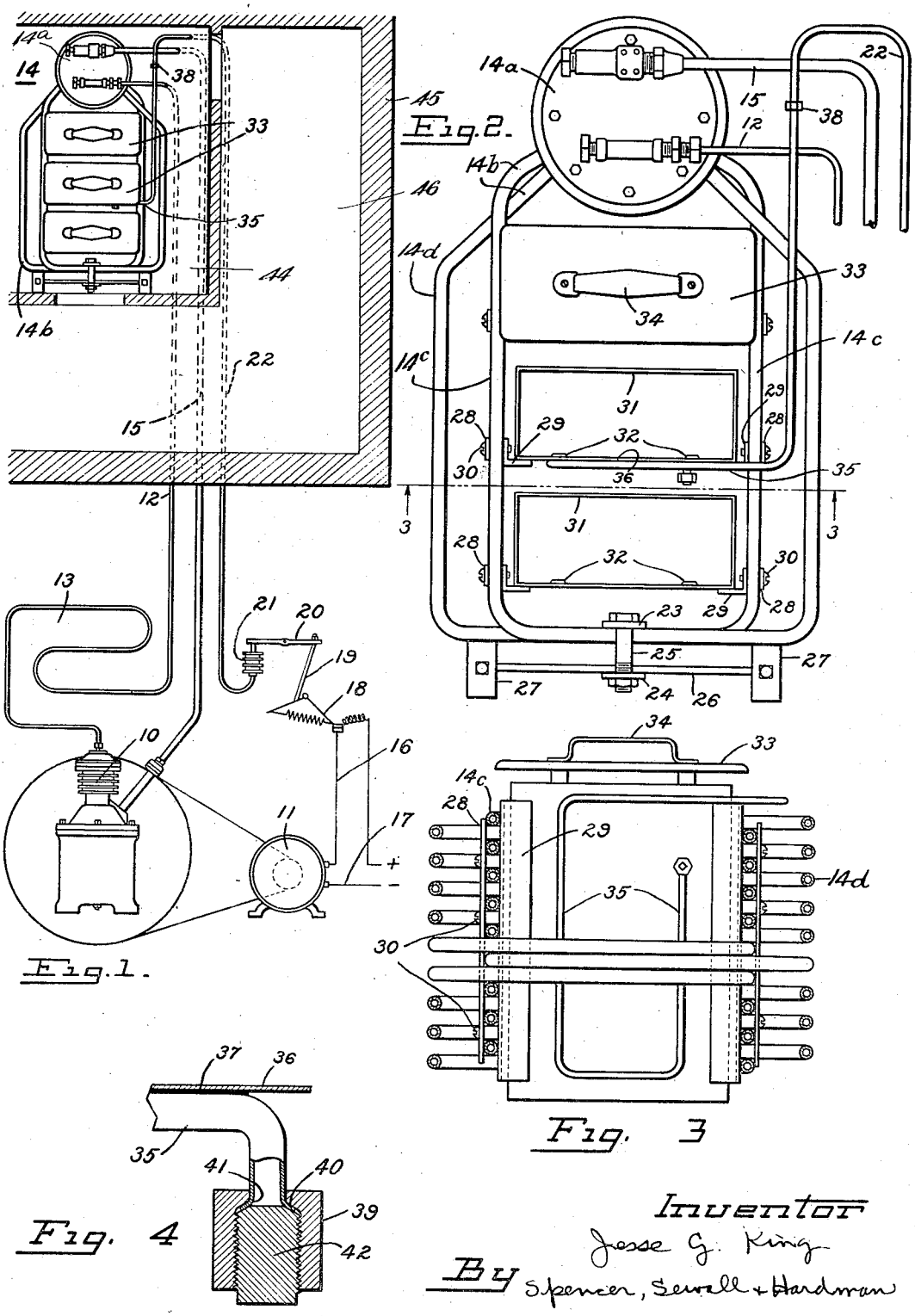

1,866,042

UNITED STATES PATENT OFFICE

JESSE G. KING, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed October 23, 1923. Serial No. 670,359.

This invention relates to thermal control of the cycles of a refrigerating apparatus; and it is particularly applicable to household refrigerating apparatus of the compressor-condenser-expander circuit type for the purpose of starting and stopping the compressor automatically in order to maintain a given range of temperature at the place where a substance to be chilled by the expansion unit is located.

One of the objects of this invention is to quickly chill a substance within the cabinet without materially affecting the average temperature of the main part of the food compartment of the cabinet and without materially reducing the pressure within the expansion unit of the system. In carrying out this object a container for the substance to be chilled quickly is located in a relatively cold part of the cabinet, for example below the cooling unit or within the cooling unit depending upon the temperature desired. A controller for starting and stopping the compressor is provided and includes a temperature responsive element located so as to be influenced by the temperature of the container and by the environment temperature. In this way the temperature of the main part of the food compartment will not be reduced to an extent dangerous to articles of food therein; nor will the pressure within the expansion unit be reduced to such a low degree that the efficiency of the refrigerating apparatus is materially decreased; but the refrigerating cycle will occur more frequently in order to reduce quickly the temperature of the container for the substance to be chilled.

This invention, therefore, consists in the art of controlling automatically the cycles of a refrigerating apparatus in accordance with the heat of a substance to be cooled and in the combination in a refrigerating apparatus of a thermostat or heat responsive device, in juxtaposition with a container or support for water, food or other substance to be cooled, and a means operated by the thermostat for initiating or discontinuing the cycles of operation.

Other objects of the present invention are to provide a refrigerating system which will, in addition to quickly congealing and cooling substances, insure a substantially constant temperature and humidity condition within a refrigerator cabinet. In the ordinary use of refrigerators, moisture in circulating air of the cabinet condenses and then freezes on the cooling unit of the system. The circulating air withdraws the moisture from the food products and if this withdrawing is excessive, it is detrimental to the food products. For example, if too much moisture is withdrawn from meats, the meats will turn dark and be unsalable, likewise, if too much moisture is withdrawn from vegetables they will wilt and lose their crispness. Moreover, if an excessive quantity of condensed moisture is frozen on the cooling unit, this frost or ice will impair refrigeration of the circulating air and lower the efficiency of the system. My invention contemplates a refrigerating system arranged and controlled so that an excessive amount of moisture will not be withdrawn from the food products to be refrigerated and excessive accumulation of frost or ice on the cooling unit is eliminated. One manner of carrying out this invention is to provide a cooling unit which need not be reduced to such low temperature as to chill the circulating air to such an amount that the moisture in the air is readily condensed and frozen and the arrangement such that such moisture which is frozen during a part of the cycle of operation will melt during another part and such melt moisture will be reabsorbed by the circulating air.

In the accompanying drawing, in which like reference characters indicate like parts throughout the several views, Fig. 1 is a diagram of a refrigerating machine illustrating the application of this invention;

Fig. 2 is a front elevation of the expansion unit of a refrigerating machine with a thermostatic device applied in contact with one of the ice tray sleeves;

Fig. 3 is a horizontal section on the line 3—3 of Fig. 2 except that three turns of the evaporating coil of the expansion unit are shown unsevered, and Fig. 4 is a detail view, partly in vertical section, of the bottom of an ice tray sleeve with a thermostatic tube soldered thereto, and having its sealed end depending therefrom.

In Fig. 1, numeral 10 indicates a compressor; 11 a prime mover, which may be an electric motor, for operating the compressor; 12 the liquid or high pressure conductor for the refrigerant, said high pressure conductor including a condenser 13, and extending from the high pressure side of the compressor to the expansion unit or "boiler". The cooling unit of the refrigerating system is herein shown as an expansion unit or "boiler" which is indicated as a whole by 14 and comprises an expansion chamber 14a and an evaporating coil comprising loops 14b. The liquid conductor 12 is tapped into the lower portion of the expansion chamber. It will be understood that admission of liquid refrigerant from conductor 12 into chamber 14a is controlled as usual by a float valve within the chamber or any known and approved liquid control device in use for this purpose. From the upper part of chamber 14a the low pressure or vapor conductor 15 leads back to the low pressure side of the compressor 10. This construction and arrangement is typical of refrigerating machines of the compressor-condenser-expander circuit type. The expansion unit 14 is located within the cooling compartment 44 of a cabinet 45 which also is provided with a food compartment 46 which is cooled by the circulation of air through said compartments.

The prime mover for operating the compressor is preferably an electric motor, the circuit of which is indicated by 16 and 17, the conductor 16 including a switch 18 illustrated conventionally as a snap switch of known construction. Numeral 19 represents a rod having one end attached to the switch and its other end attached to a movable operating member, here shown as a lever 20, adapted to be moved so as to open and close the switch by a flexible diaphragm 21 which may be a metallic tubular bellows-like member of well known form. Pressure is admitted to the bellows 21 from the pipe 22, one end of which communicates with the interior of the bellows and the other end with a thermostatic bulb or tube 35, as will be presently described. The pressure within pipe 22 of course rises and falls in accordance with the temperature of the thermostatic bulb since both the bulb and tube contain a volatile fluid which may be the same as the refrigerant in the circulating system, for example, sulphur dioxide.

The expansion unit illustrated is intended to be used without a brine tank, although this invention is not limited in its application to apparatus having this form of expansion unit. The alternate turns or loops 14b of the expansion coil are staggered and reversed in contour (right and left) as shown. The structure thus formed provides a cooling unit having a freezing zone or compartment for quickly freezing or congealing substances therein and provides an air cooling zone for the general cooling of the food storage compartment. Outer courses 14b of the turns provide between them a cooling zone for cooling circulating air and the inner courses 14c being nested between the outer course 14b provides a freezing zone which is protected or shielded from the warming action of the circulating air. The turns are fixed relatively to each other by battens 23 and 24 which extend crosswise of the bottoms of the turns or longitudinally of the unit and are clamped in position by bolts 25. The batten 23 engages the turns directly or by interposition of suitable packing material (not shown) and the batten 24 engages cross members 26, which in turn are fastened to longitudinal supporting members 27. The inner courses 14c of the staggered turns 14b are also clamped in common planes by two series of battens 28 and angle bars 29 secured together by bolts 30 which pass through said battens 28 and angle bars 29 and between the courses 14c of the coil. The battens 28 and angle bars 29 are spaced vertically whereby the latter serve as properly spaced shelves to support ice tray receiving chambers or sleeves 31 which may be of metal and may be secured to said angle bars by soldering or otherwise. To take the wear of the ice trays and permit them to slide easily, the upper face of the bottom parts of the sleeves 31 may be provided with metallic supporting ribs or elevations 32. Numeral 33 indicates the front plate of an ice tray designed to be seated in a sleeve 31, and 34 indicates a handle by which the tray may be slid into said sleeve or drawn therefrom. The sleeves are well spaced from each other and provide abundantly for circulation of air. The construction and arrangement of the turns or loops 14b and the means for securing them together, mounting the expansion unit and holding the ice tray sleeves in place, constitute a distinct invention not claimed herein and which is here described only with sufficient particularity to disclose a structure to which the invention forming the subject of this application may be advantageously applied.

In the exemplary embodiment of this invention shown in the drawing, a thermostatic bulb or tube 35 is disposed in good heat conducting contact with the under side of the bottom 36 of one of the ice tray sleeves 31. The tube 35 is preferably curved so as to have rather extensive contact with said bottom. A metallic bond 37, as of solder, secures the thermostatic tube 35 to said bottom 36, whereby a broad and good heat conducting path of metal exists between a tray resting on said bottom 36 and the fluid within the tube 35. The described thermal tube 35 is connected to the pipe 22, which communicates with the pressure sensitive diaphragm or bellows 21. The connection between tube 22 and the thermostatic tube may be made, if desired, by a union coupling 38 for convenience of assemblage or disassemblage.

The extremity of the thermostatic tube may be stopped by a removable seal which comprises an internally threaded nut-like member 39 having an internal flange 40 against which, within the bore of the nut-like member, the end 41 of tube 35 is compressed and expanded by the threaded compression and tube-expanding plug 42. The sealed end of thermostatic tube 35 depends from the bottom of sleeve 31 so that the plug is readily accessible for removal and replacement. By uncoupling the union 38, and removing plug 42, fresh sulphur dioxide or other fluid with which the thermostatic tube is to be charged, may be blown through the tube to displace air, oil, or other matter not desired therein, and the tube again sealed and coupled.

For the purpose of describing the mode of operation, it may be assumed that it is desired to freeze water into blocks of ice, or to congeal a liquid food mixture into a dessert ice or other frozen delicacy. Water, or the prepared delicacy is placed in the ice tray and the tray inserted into one of the sleeves 31 to which the thermostatic bulb is bonded. Assuming that at this time the compressor is not operating, that the temperature is nearly 32° F., at the coil, and that the control has been calibrated to start the compressor when the pressure within the thermostatic tube is that which corresponds to a temperature of 32° therein and to stop it when the pressure therein corresponds to a temperature of 10° F., it will be clear that the heat from the relatively warm water or dessert (which would be probably at least at room temperature) will be quickly conducted through the metallic path of the bottoms of the tray and sleeve, and the metallic bond to the interior of the thermostatic tube, raising the temperature and pressure of the fluid within it to a degree sufficient to quickly start the compressor. The compressor will continue in operation until the heat within the thermostat has decreased to the point where the corresponding pressure therein will open the switch and stop the compressor. The first operating cycle of the compressor under these conditions will generally be prolonged beyond the normal cycle for the reason that the heat transferred to the thermostat will prevent the fluid therein from cooling as fast as does the coil or the fluid surrounding it. When the temperature of the fluid in the thermostat reaches about 10° F., and the pressure of the fluid within it is correspondingly reduced to the point which will cause the control mechanism to operate in the opposite sense, compared with its immediately preceding operation, the compressor will stop. At this time the temperature of the coil may be lower than 10° F., owing to the delayed action due to the transfer of heat between the water or dessert and the fluid in the thermostat. The temperature of the coil now begins to rise slowly in accordance with the usual cycle when the compressor is not operating. Because of the high specific heat of the water or watery dessert, the temperature of the fluid within the thermostat will rise faster than that of the coil and surrounding air or other fluid and will reach the starting point when the temperature of the coil is still low. For example, although the coil temperature may be only 20° F., the fluid within the thermostat may be over 32° F. Consequently, the compressor will be started sooner than it would be in its normal cycle. This operation on short cycles will continue until the water or dessert is frozen or congealed. As the freezing process progresses the cycles gradually approach the normal. But, if the setting is such, as indicated, that the compressor will start at a pressure within the thermostat corresponding to a temperature of 32° F., it will be apparent that the contiguity of the ice in the tray may keep the temperature within the thermostat from rising above 32° F., for a short time while the temperature of the coil is a little higher, particularly the air cooling portions 45d which lie outwardly of branch courses 45c. Under these circumstances this fact may be taken advantage of to defrost the coil, particularly the portions 45d, as the slightly higher temperature of the coil at the end of the inoperative cycle of the compressor will melt off the frost or ice on the coil before the compressor starts.

It is quite apparent that by virtue of this method of operation frost will not accumulate on the coil and that this method has certain advantages over that type of system in which frost is permitted to accumulate. It is necessary to maintain a mean temperature of the cooling unit below 32° F., in order to cool the portions of the cabinet space from the cooling unit, at the desired temperature. If frost is permitted to accumulate, this frost would function as insulation and a temperature of 32° F., would only be available for cooling circulating air. As the accumulation of frost continues, the temperature of the food spaces increases. By permitting the coil portions 14b to defrost periodically a more uniform and colder temperature is insured. Moreover at least a portion of the moisture withdrawn from the air during the operating of the compressor will melt during the inoperative phase and be reabsorbed by the air. In this manner withdrawal of moisture from the food products will be minimized and the products will remain in their most desirable state.

Although I have illustrated and described one preferred embodiment of the invention, it will be understood that various modifications may be made within the scope of the appended claims without departing from the spirit of the invention.

What I claim and desire to secure by Letters Patent of the United States is:

1. A refrigerator, comprising in combination, a cabinet, a cooling unit within the cabinet, means for circulating a refrigerating medium through said unit, a chamber for substance to be cooled within said unit, and a thermostat for controlling said means secured to the underside of a wall of said chamber, said thermostat having a substantial portion of its body attached in good heat conducting relation to said chamber whereby the thermostat is responsive to the temperature of the substance to be cooled and to the temperature of the unit.

2. A refrigerator, comprising in combination, a cabinet, a cooling unit within the cabinet, means for circulating a refrigerating medium through said unit, a chamber for substance to be cooled in direct thermal contact with and disposed within the unit, and a thermostat for controlling said means and secured to the underside of a wall of said chamber, said thermostat having a substantial portion of its body attached in good heat conducting relation to said chamber whereby the thermostat is responsive to the temperature of the substance to be cooled and to the temperature of the unit.

3. A refrigerator, comprising in combination, a cabinet, a cooling unit within the cabinet, means for circulating a refrigerating medium through the unit, said cooling unit having a portion providing a freezing zone adapted to receive an ice tray, a thermal conducting support for carrying the tray within the freezing zone, control mechanism for controlling said circulating means in response to the temperature of the substance contained within the tray, said mechanism including a thermostat in intimate heat exchange relation with the support.

4. A refrigerator, comprising in combination, a cabinet, a cooling unit within the cabinet, means for circulating a refrigerating medium through the unit, said cooling unit having a portion providing a freezing zone adapted to receive an ice tray, a thermal conducting support for carrying the tray within the freezing zone, control mechanism for controlling said circulating means in response to the temperature of the substance contained within the tray, said mechanism including a thermostat, said thermostat comprising a metal tube containing a volatile fluid bonded to said support.

5. A refrigerator comprising in combination a cabinet, a cooling unit within the cabinet, means for circulating a refrigerating medium through the unit, said cooling unit having a portion providing a freezing zone adapted to receive an ice tray, a support adapted to carry the ice tray within the freezing zone, control mechanism for controlling said circulating means in response to the temperature of the unit and the substance contained within the tray, said mechanism including a thermostat disposed in intimate heat exchange relation with the support.

6. A refrigerator, comprising in combination, a cabinet, a cooling unit within the cabinet, means for circulating a refrigerating medium through the unit, said cooling unit having a portion providing a freezing zone adapted to receive an ice tray, control mechanism for controlling the circulating means in response to the temperature of the substance contained within the tray, said mechanism including a thermostat disposed in intimate heat exchange relation with the tray.

7. A refrigerator, comprising in combination, a cabinet, a cooling unit within the cabinet, means for circulating a refrigerating medium through the unit, said cooling unit having a portion providing a freezing zone adapted to receive an ice tray, control mechanism for maintaining normally a predetermined mean temperature of the unit and for obtaining a lower mean temperature of the unit when a warm substance is contained within said tray, said mechanism including a thermostat for controlling the circulating means, said thermostat being arranged in intimate heat exchange relation with the tray so as to be affected by the warming action of the substance within the tray to modify the operation of the circulating means.

In testimony whereof I hereto affix my signature.

JESSE G. KING.